US011400922B2

(12) United States Patent
Murray et al.

(10) Patent No.: US 11,400,922 B2
(45) Date of Patent: Aug. 2, 2022

(54) METHOD AND SYSTEM FOR PARKING (71) Applicant: Ford Global Technologies, LLC, Dearborn, MI (US)

(72) Inventors: James Nicholas Murray, Chelmsford (GB); Ben Moffatt, Iver Heath (GB); Will Barker, Berkhamsted (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 19 days.

(21) Appl. No.: 16/992,239

(22) Filed: Aug. 13, 2020

(65) Prior Publication Data
US 2021/0053556 A1    Feb. 25, 2021

(30) Foreign Application Priority Data

Aug. 19, 2019   (GB) .................................... 1911863

(51) Int. Cl.
| B60Q 1/48 | (2006.01) |
| B60W 30/06 | (2006.01) |
| G05D 1/02 | (2020.01) |
| G08G 1/14 | (2006.01) |

(52) U.S. Cl.
CPC .......... B60W 30/06 (2013.01); G05D 1/0297 (2013.01); G08G 1/143 (2013.01); G08G 1/146 (2013.01); B60W 2554/20 (2020.02); B60W 2554/801 (2020.02); B60W 2554/802 (2020.02)

(58) Field of Classification Search
CPC ............. B60W 30/06; B60W 2554/20; B60W 2554/801; B60W 2554/802; B60W 50/0098; B60W 2050/0043; B60W 2552/50; B60W 2554/80; G05D 1/0297; G05D 1/0225; G08G 1/143; G08G 1/146; G08G 1/168; G08G 1/14; B62D 15/0285; G06K 9/00812
USPC ...................... 340/932.2, 933, 988, 989, 937
See application file for complete search history.

(56) References Cited

U.S. PATENT DOCUMENTS

| 10,317,913 | B2 | 6/2019 | Harvey |
| 2003/0058081 | A1 | 3/2003 | MacPhail et al. |
| 2012/0188100 | A1* | 7/2012 | Min ........................ E04H 6/426 340/932.2 |

(Continued)

FOREIGN PATENT DOCUMENTS

| DE | 102014223899 A1 | 5/2016 |
| EP | 3284649 A1 | 2/2018 |
| WO | 2017182186 A1 | 10/2017 |

OTHER PUBLICATIONS

UK Search and Examination Report dated Feb. 19, 2020 re Appl. No. GB1911863.7.

*Primary Examiner* — Anh V La
(74) *Attorney, Agent, or Firm* — Frank A. MacKenzie; Bejin Bieneman PLC (57) ABSTRACT

Parking a plurality of autonomous or semi-autonomous vehicles can comprise obtaining information regarding a first vehicle of the plurality of vehicles; obtaining information regarding an environment surrounding the first vehicle; and selecting a parking arrangement for the first vehicle, wherein the parking arrangement is selected such that at least one of access to; and opening of at least one door of the first vehicle is prevented by proximity of the first vehicle to at least one of a second vehicle of the plurality of vehicles; and a structure in the environment.

20 Claims, 7 Drawing Sheets

(56) References Cited

U.S. PATENT DOCUMENTS

| | | |
|---|---|---|
| 2015/0057870 A1* | 2/2015 | Lee .................. B60W 30/06 |
| | | 701/23 |
| 2015/0220791 A1 | 8/2015 | Wu et al. |
| 2015/0279210 A1 | 10/2015 | Zafiroglu et al. |
| 2015/0344028 A1* | 12/2015 | Gieseke ............... B62D 15/028 |
| | | 701/1 |
| 2016/0223345 A1 | 8/2016 | Thakur et al. |
| 2017/0008515 A1 | 1/2017 | Seo et al. |
| 2017/0212511 A1 | 7/2017 | Paiva Ferreira et al. |
| 2017/0365170 A1* | 12/2017 | Lazic .................... G08G 1/143 |
| 2018/0052860 A1 | 2/2018 | Hayes et al. |
| 2018/0196429 A1 | 7/2018 | Goldberg et al. |
| 2018/0237069 A1* | 8/2018 | Gehin ................... G05D 1/0038 |
| 2018/0307250 A1 | 10/2018 | Harvey |
| 2019/0018413 A1* | 1/2019 | Wood ................... G05D 1/0088 |

* cited by examiner

METHOD AND SYSTEM FOR PARKING

CROSS-REFERENCE TO RELATED APPLICATION

This patent application claims priority to United Kingdom Application No. GB 1911863.7 filed on Aug. 19, 2019, which is hereby incorporated by reference in its entirety.

BACKGROUND

When a vehicle is parked and unattended, it is known that persons of criminal intent may attempt to gain access to the vehicle, possibly through doors or windows. It is especially desirable for this to be prevented when goods are kept in the vehicle. Some vehicles, for example vans, may be more likely to contain goods when parked.

Improvements are therefore desired to increase vehicle security.

SUMMARY

The present disclosure relates to a method and system for parking vehicles, e.g., a parking method and system for autonomous and/or semi-autonomous vehicles to improve vehicle security.

According to a first aspect of the present disclosure, there is provided a method for parking a plurality of vehicles, such as autonomous and/or semi-autonomous vehicles, the method comprising obtaining information regarding a first vehicle of the plurality of vehicles; obtaining information regarding an environment surrounding the first vehicle; and selecting a parking arrangement for the first vehicle. The parking arrangement is selected such that at least one of access to a part of the vehicle which is vulnerable to damage or attack and opening of at least one door of the first vehicle is prevented by proximity of the first vehicle to at least one of a second vehicle of the plurality of vehicles; and a structure in the environment. The part of the vehicle which is vulnerable to damage or attack may be, for example, a door or window of the vehicle.

The present disclosure could be applied to many types of vehicle such as a motor vehicle (e.g. car, van, truck etc.), industrial or agricultural vehicles (e.g. tractor, forklift, bulldozer, excavator etc.), marine vessel, aircraft or any other type of vehicle.

The method may additionally comprise obtaining information regarding the second vehicle and selecting a parking arrangement for the second vehicle. The parking arrangement may be selected such that at least one of access to a part of the vehicle which is vulnerable to damage or attack and opening of at least one door of the second vehicle may be prevented by proximity of the second vehicle to at least one of the first vehicle; the structure in the environment; and at least one additional vehicle.

The method may additionally comprise obtaining information regarding the at least one additional vehicle; and selecting a parking arrangement for the at least one additional vehicle. The parking arrangement may be selected such that at least one of access to a part of the vehicle which is vulnerable to damage or attack and opening of at least one door of the at least one additional vehicle may be prevented by proximity of the at least one additional vehicle to at least one of the first vehicle; the second vehicle; the structure in the environment; and if greater than one additional vehicle, other vehicles of the at least one additional vehicle.

The structure in the environment may be a barrier, such as a wall, fence or building, sufficient to prevent access to a part of the vehicle which is vulnerable to damage or attack and/or opening of a door.

The information regarding the environment may include information regarding parts of vehicles which are vulnerable to damage or attack, such as the position of the doors of any vehicles already parked in the environment. The at least one door may be at least one of a side door and a rear door.

The parking arrangement may be selected such that the fewest vehicles are required to move for any single vehicle to leave the parking arrangement. The parking arrangement may be additionally selected such that the number of vehicles able to park in the environment is maximised. The parking arrangement may be selected such that the total number of doors blocked is maximised. The parking arrangement may be selected according to a pre-determined hierarchy. The parking arrangement may be selected such that vehicles nearest the top of the hierarchy are parked nearest the center of the parking arrangement.

At least some of the information regarding the environment may be gathered by a vehicle already parked in the parking environment. Any vehicles already parked in the parking environment may communicate the information to an approaching vehicle attempting to park.

The arrival of a vehicle may trigger the re-initiation of the method for all vehicles within the parking environment to select a new parking arrangement.

The new parking arrangement may be selected such that the fewest changes are needed to the previous parking arrangement.

The method for parking may be re-initiated upon departure of any vehicle from the parking arrangement.

According to a second aspect of the present disclosure, there is provided a system for parking at least one autonomous or semi-autonomous vehicle in an environment. The system may comprise a controller, wherein the controller may be configured to carry out the above-mentioned method for parking.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

BRIEF DESCRIPTION OF DRAWINGS

For a better understanding of the present disclosure, and to show more clearly how the claimed invention may be carried into effect, reference will now be made, by way of example, to the accompanying drawings in which:

DETAILED DESCRIPTION

Figure 1:
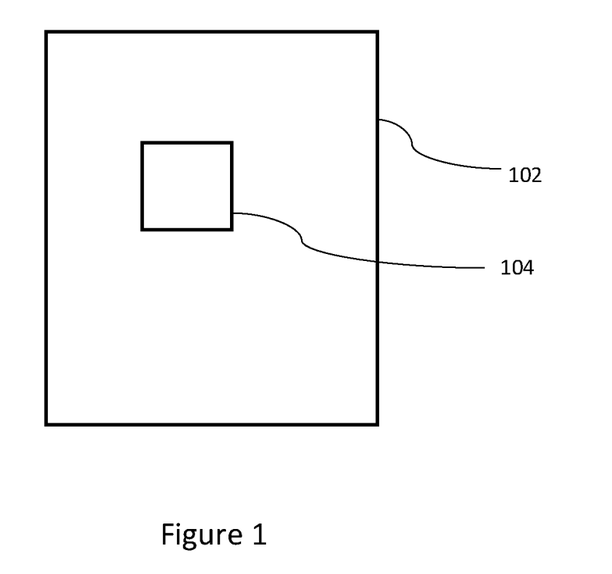
FIG. 1 is a schematic diagram of an exemplary system.

FIG. 1 shows a system 102 comprising a controller 104. System 102 is a system for parking at least one autonomous or semi-autonomous vehicle in an environment. Controller 104 is configured to select a parking arrangement for the at least one vehicle. The parking arrangement for the at least one vehicle is selected such that access to and/or opening of at least one door of a first vehicle of the at least one vehicle is prevented by the proximity of the first vehicle to a second vehicle of the at least one vehicle and/or by proximity of the first vehicle to a structure in the environment.

In order to select a parking arrangement for the at least one vehicle, the controller 104 may additionally be configured to receive information regarding the environment, receive information regarding the at least one vehicle being parked, determine a plurality of possible parking locations in the environment from the information and, using the possible parking locations, select a parking arrangement for the at least one vehicle. For conciseness and simplicity of the description, references to selection of the parking arrangement later in this disclosure should be considered to include the above description relating to the steps which the controller 104 may additionally be configured to carry out.

The information regarding the environment may be from a number of suitable sensing and/or detecting devices housed within the at least one vehicle itself, such as LIDAR, RADAR, cameras, parking sensors and GPS. This information may be from a source external to the at least one vehicle and/or the environment. For example, at least some of this environmental information may be communicated by a vehicle in the parking environment which has already been parked, by the parking system of the present disclosure or otherwise, using information it has itself collected. This environmental information may pertain to structures in the environment, such as their position, height, width and their nature, i.e. whether the structure is another vehicle which has not been parked by this system, the location and number of doors of this vehicle, or whether the structure is a permanent barrier, such as a wall.

The information regarding the at least one vehicle being parked may be pre-loaded onto the controller 104 in the case that the at least one vehicle comprises the controller 104, or in the case that the controller 104 is external to the at least one vehicle, may be obtained by the controller 104 communicating with the sensing devices described above.

The plurality of possible parking locations within the parking environment may be determined according to the information regarding the environment and the information regarding the at least one vehicle. For example, the characteristics of the environment, dimensions of any spaces within the environment, the dimensions of the vehicle, the location and number of any doors of the vehicle may all be used when determining a plurality of possible parking locations.

The parking arrangement may be selected from the plurality of possible parking locations according to a number of factors which may or may not be "switched on". These factors can include:

TABLE 1

| Number | Factor |
|---|---|
| 1 | The importance of each vehicle |
| 2 | The importance of any doors within each vehicle |
| 3 | The ability of each vehicle to be rearranged within the parking arrangement upon the subsequent arrival of further vehicles |
| 4 | Optimisation of space within the parking environment to maximise the number of vehicles that can park therein |
| 5 | The type of vehicles present |

TABLE 1-continued

| Number | Factor |
|---|---|
| 6 | The ability of any vehicle to depart the parking arrangement without requiring other vehicles to relocate |

Depending on which factors are switched on, different parking arrangements may be achieved even when all other variables are kept constant, e.g. the number of vehicles, the type of vehicles, and the characteristics of the environment.

Figure 2:
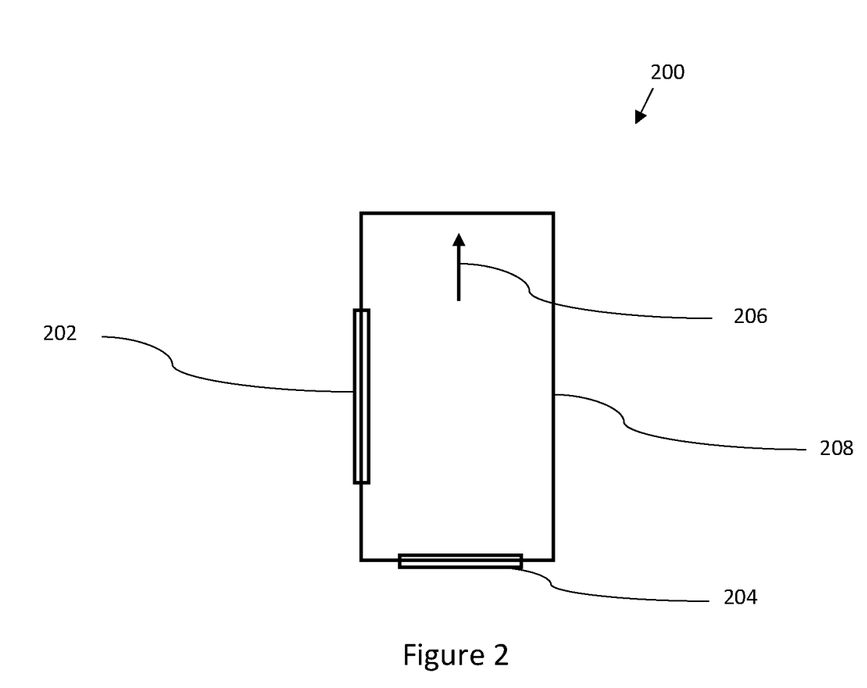
FIG. 2 is a schematic plan view of a vehicle.

FIG. 2 illustrates a vehicle 200 having a side entry point 202 (alternatively side door 202) and a rear entry point 204 (alternatively rear door 204) within the vehicle body 208. The forward direction of the vehicle is shown by the direction of the arrow 206. Side entry point 202 may comprise a sliding door, and rear entry point 204 may comprise two doors or alternatively a horizontally hinged door capable of opening upwards. The side entry point 202 may allow access to an internal cargo storage area (not shown), which may be separated from a rear cargo storage area (not shown) to which rear entry point 204 allows access. Alternatively, side entry point 202 and rear entry point 204 may allow access to the same cargo area (not shown). Each vehicle 200 may further comprise a controller 104. Alternatively, the controller 104 may be located separately from each vehicle and be in communication with each vehicle 200. For the sake of clarity, the doors 202, 204 of vehicles shown in FIGS. 3 to 5 will not be labelled unless directly relevant. It will be understood by the skilled person which features are present.

It is noted that vehicle 200 shown in FIG. 2 is exemplary of a vehicle predominantly used to transport goods or cargo, e.g. a van, typical of left-hand traffic countries (i.e. countries in which the vehicle is driven on the left hand side of the road), in which the side entry point 202, e.g. cargo door, is present on the left side of the vehicle (relative to the forward direction). The parking system of the present disclosure, however, is equally applicable to right-hand traffic systems, which may have side entry points on the right side of the vehicle. Furthermore, the parking system described herein may equally be applicable to vehicles which are not predominantly used to transport goods or cargo, e.g. passenger vehicles, and vehicles having doors on greater than two sides of the vehicle body, such as a number of passenger doors, and/or a driver door in the case of semi-autonomous vehicles.

FIGS. 3*a-e* (collectively FIG. 3) illustrate a number of stages in the formation of a parking arrangement comprising ten vehicles 301-310. The parking arrangement selected after the arrival of each successive vehicle is selected with the following factors being switched on:

TABLE 2

| Number | Factor |
|---|---|
| 1.3 | All vehicles are of equal importance |
| 2.3 | All vehicle doors are of equal importance |
| 3.3 | None of the vehicles will be rearranged within the parking arrangement upon the subsequent arrival of further vehicles |
| 4.3 | Optimisation of space within the parking environment to maximise the number of vehicles that can park therein |
| 5.3 | Only vehicles of the type shown in FIG. 2 are present |
| 6.3 | All vehicles must be able to depart the arrangement without requiring others to relocate (temporarily or otherwise) |

In order to understand the operation of the system, the following scenario is described in which the vehicles 301-310 arrive in sequence in the order 301, 302, 303 . . . 310, separated in time such that the subsequent vehicle arrives only after the previous vehicle has completed parking.

Figure 3A:
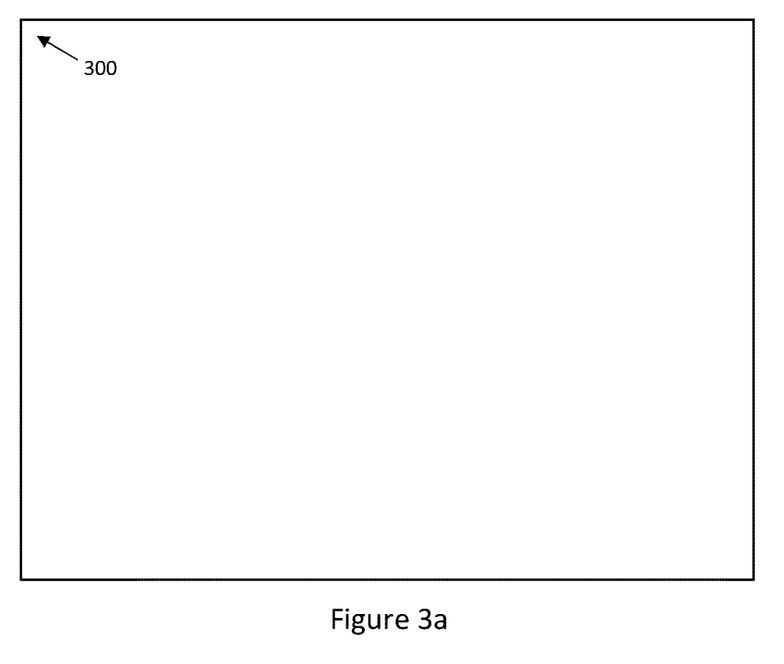
FIGS. 3a-e show a number of stages in the formation of a parking arrangement in a substantially open environment.
Figure 3B:
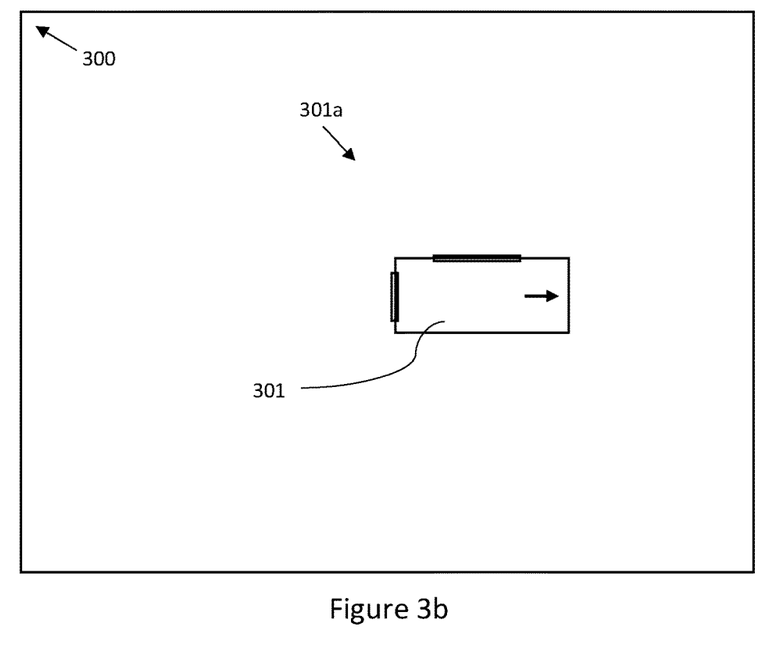

FIG. 3a shows a parking environment 300. It is noted that the environment 300 can extend beyond the confines of the symbolic box used to represent the parking environment, and that the boundaries of the symbolic box do not represent structures in the environment 300. This example may be applicable in, for example, a car park, where vehicles are not permitted to park proximally to the boundaries of the car park for the purposes of vehicular and/or pedestrian access.

The first vehicle 301 approaches the parking environment 300. The controller 104 may receive information regarding the environment. As described above, at least some of this information may be from a number of suitable devices housed within the vehicle 301 itself. Alternatively, at least some of this information may be communicated from a source external to vehicle 301 and/or the environment. The controller 104 may determine a plurality of possible parking locations (not shown) within the parking environment 300 from this information. In the open space of the parking environment 300 which is significantly larger than the dimensions of the vehicle body 208, these possible parking locations may be large in number. If there are no structures within the environment, as is the case in the example of FIG. 3, a parking arrangement will be selected in which vehicle 301 parks at a particular location surrounded on all sides by open space. Vehicle 301 parked in this location within the parking environment 300 forms a parking arrangement 301a. When there is only one vehicle in an environment without barriers, this one vehicle may park in a location in preparation for the implementation of the system when at least one additional vehicle arrives.

Figure 3C:
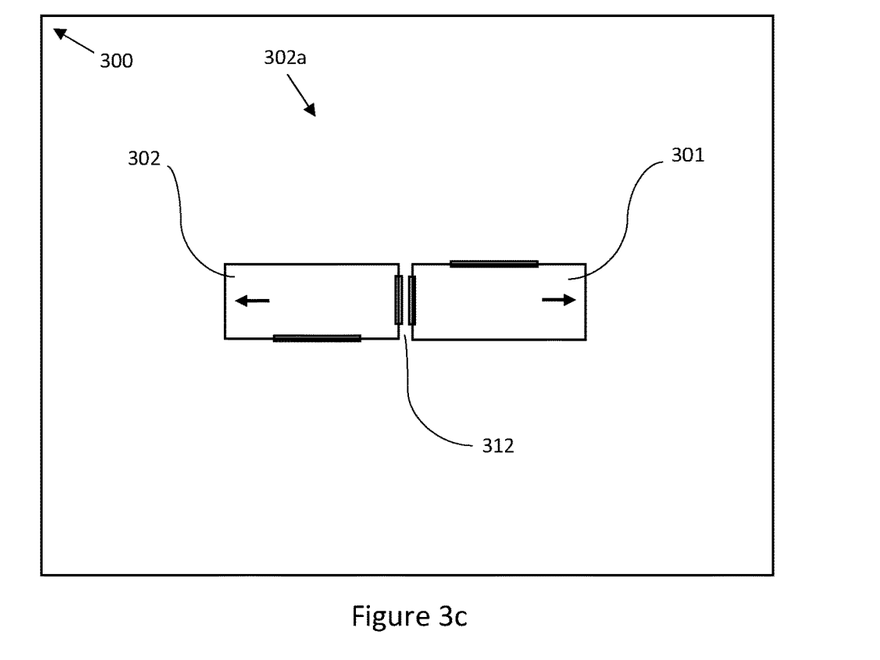
Figure 3D:
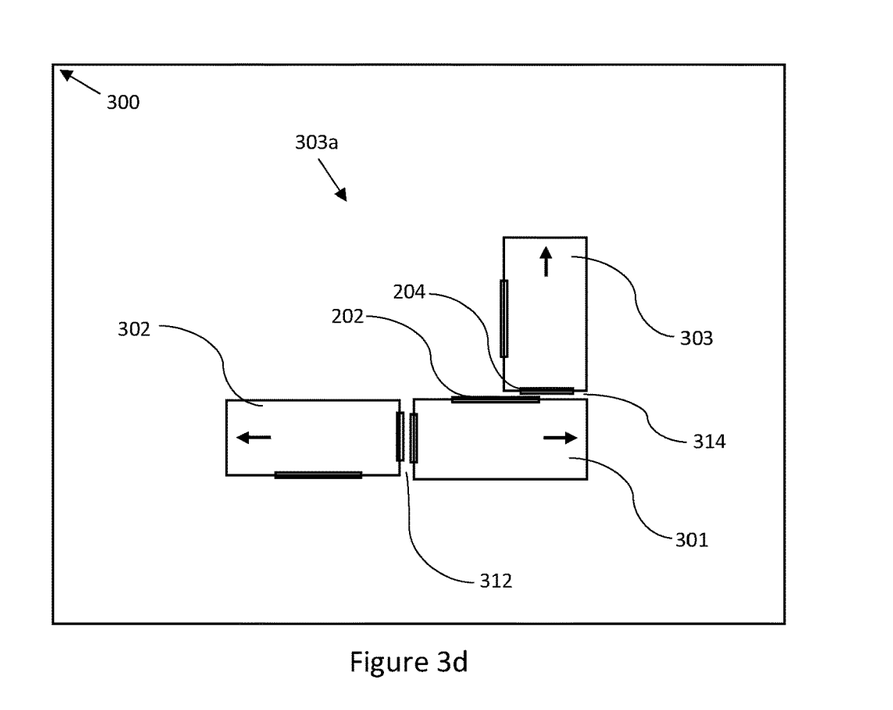

The second vehicle 302 approaches the parking environment 300 and parking arrangement 301a. The controller 104 receives information regarding the parking environment 300. As described above, this information may be from a number of sources. Additionally, this information may be communicated by the vehicle 301 already parked in parking arrangement 301a, or from a source external to vehicles 301, 302, and/or the environment. The controller will be aware of the fact that first vehicle 301 will not be rearranged (factor 3.3 above), and so the controller will treat the vehicle 301 as a structure in the environment rather than a vehicle available to be rearranged, but the location of the doors of vehicle 301 will be considered nonetheless. The controller may then determine a plurality of possible parking locations (not shown) within the parking arrangement. A number of these parking locations will be in close proximity to vehicle 301. According to the positioning of the doors 202, 204 of each of the vehicles 301, 302, a parking arrangement will be selected for vehicle 302 such that vehicle 302 is sufficiently close to vehicle 301, and vice versa, that access to and/or opening of a number of doors of the vehicles 301, 302 is prevented. This parking arrangement 302a is shown in FIG. 3c. The gap 312 between the two vehicles 301, 302 is small enough that a human cannot realistically pass between the car bodies 208, 208 of the vehicles 301, 302, and/or, the gap 312 between the two vehicles 301, 302 may be small enough that at least one of the doors 202, 204 cannot be opened due to the close proximity of at least the body 208 of the other vehicle.

In the example shown in FIG. 3c, the rear doors 204 of each vehicle 301, 302 are blocked by the rear end of the other vehicle 302, 301 respectively. As such, individuals of criminal intent are unable to gain entry to the vehicles 301, 302 by means of at least the doors 204 of each vehicle 301, 302. In this way, the vehicles 301, 302 have co-operated by co-ordinating their parking such that the number of vehicle doors left on the exterior of the parking arrangement is minimised according to the factors which are 'switched on'. As such, the vehicles 301, 302 mutually enhance one another's security.

The third vehicle 303 approaches the parking arrangement 302a which now comprises the vehicles 301, 302 parked 'back-to-back'. The controller 104 may undergo the same steps described above, receiving information about the environment, including the location of the vehicle doors of 301, 302, from detection systems within the vehicle 303 and/or the detection systems of vehicles 301, 302 and/or a source external to the environment 300. The controller will be aware of the fact that first and second vehicles 301, 302 will not be rearranged (factor 3.3 above), and so the controller will treat the vehicles 301, 302 as structures in the environment rather than vehicles available to be rearranged. The location of the doors of vehicles 301, 302 will be considered nonetheless. The controller 104 selects a parking arrangement for the vehicle 303. Vehicle 303 then parks in this arrangement, proximal to the vehicles 301, 302. In the example shown in FIG. 3d, the vehicle parks transversely to vehicle 301, leaving its rear end, including door 204, in close proximity to vehicle 301 and door 202 of vehicle 301. The gap 314 between the rear of vehicle 303 and the side of vehicle 301 is small enough that a human cannot realistically pass between the car bodies 208, 208 of the vehicles 301, 303. Additionally, the gap 314 between the two vehicles 301, 303 may be small enough that at least one of the doors 204 of vehicle 303 and/or the door 202 of the vehicle 301 cannot be opened due to the close proximity of at least the body 208 of the other vehicle. Vehicle 303 thus forms parking arrangement 303a in combination with vehicles 301, 302.

Figure 3E:
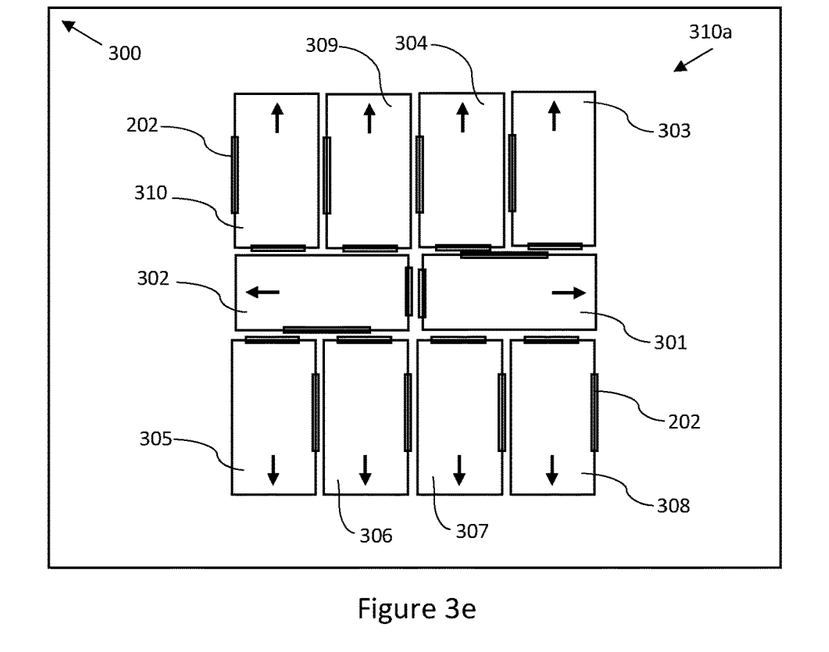

This system is then repeated for vehicles 304, 305 . . . 310 in turn, until parking arrangement 310a, shown in FIG. 3e, is formed. In parking arrangement 310a comprising vehicles of the type shown in FIG. 2, the only doors left unblocked are doors 202 of each of vehicles 308 and 310. All other vehicle doors are blocked and thus benefit from the enhanced security of the present disclosure. In this way, the vehicles 301 to 310 have co-operated by co-ordinating their parking such that their total combined security is enhanced according to the factors which are 'switched on'. As such, the vehicles 301 to 310 mutually benefit one other.

As will be appreciated by the skilled person, the exact positioning of a number of vehicles in the parking arrangement 310a is interchangeable. For example, upon arrival at the parking environment 300, vehicle 304 may park in its position shown in FIG. 3e or alternatively park (not shown) in the position that vehicle 305 occupies in FIG. 3e. Vehicle 305 may then park in the position occupied in FIG. 3e by either vehicle 304 or 306 (not shown). This interchangeability may be true for other vehicles in this arrangement.

Figure 4:
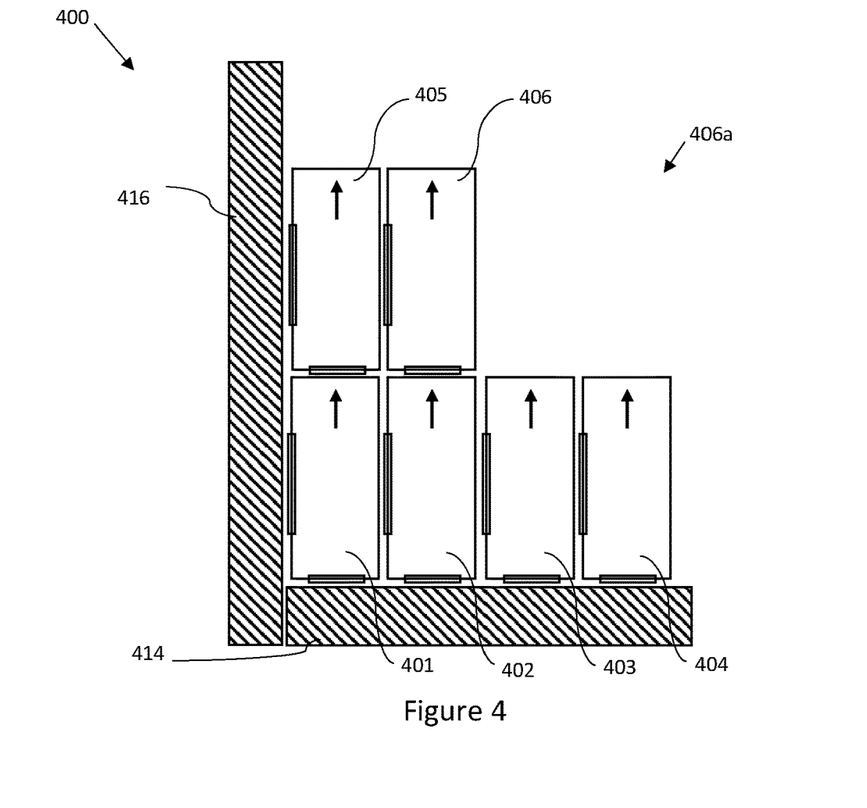
FIG. 4 shows a parking arrangement in an environment having two barriers.

FIG. 4 shows a parking arrangement 400a achieved when six vehicles 401-406 are parked in close proximity to two structures 414, 416 in the parking environment 400. These barriers are used by the system to enhance security of a number of doors of the six vehicles 401-406. Security is particularly enhanced for the first of the vehicles to arrive which, ordinarily, would be most vulnerable.

The parking arrangement formed after the arrival of each successive vehicle is selected with the following factors being switched on:

TABLE 3

| Number | Factor |
| --- | --- |
| 1.4 | All vehicles are of equal importance |
| 2.4 | All vehicle doors are of equal importance |
| 3.4 | None of the vehicles will be rearranged within the parking arrangement upon the subsequent arrival of further vehicles |
| 4.4 | Optimisation of space within the parking environment to maximise the number of vehicles that can park therein |
| 5.4 | Only vehicles of the type shown in FIG. 2 are present |
| 6.4 | Vehicles need not be positioned such that they can depart the arrangement without requiring other vehicles to relocate. |

The first vehicle, 401, approaches the parking environment 400. The controller 104 may receive information regarding the environment and may receive information regarding the vehicle 401. The controller 104 determines from this information that the two structures in the environment 414, 416 are of sufficient dimensions to be useful as barriers for enhancing vehicle security, e.g. the barriers are of sufficient dimensions and structural integrity such that the barriers cannot be easily compromised. The controller 104 may determine a plurality of possible parking locations (not shown) within the parking environment 400 which are proximal to the structures 414, 416. The controller 104 selects a parking arrangement for vehicle 401. In this example, the parking arrangement 401a (not shown) is chosen such that the doors 202 and 204 of vehicle 401 are sufficiently close to barriers 416, 414 respectively that access to and/or opening of doors 202, 204 is prevented due to the proximity of the structures 414, 416. Vehicle 401 parked in this location within parking environment 400 forms a parking arrangement 401a (not shown).

As vehicles 402, 403 . . . 406 arrive in sequence, the controller 104 carries out the above process for each vehicle, finally selecting parking arrangement 406a shown in FIG. 4. As above, vehicles 401 to 406 are parked sufficiently proximal to one another and/or the barriers 414, 416 that it is not possible for a person to pass between the vehicles and barriers to access doors 202, 204 of each vehicle and/or for doors 202, 204 of each vehicle to be opened. In the case of parking arrangement 406a, not a single vehicle door 202, 204 is left unblocked.

Similarly to the examples of FIG. 3, as factor 3.4 above is again switched off, all previously parked vehicles will be treated as structures in the environment, but the location of their doors will still be considered.

As with parking arrangement 310a, it will be understood by the skilled person that the exact location of a number of vehicles is interchangeable. For example, vehicle 402 could have alternatively parked in the location occupied by vehicle 405 in FIG. 4. The controller 104 may then have selected a different parking arrangement for each subsequent vehicle.

In parking arrangement 406a, some vehicles will be required to move to allow others to depart the arrangement, e.g. vehicle 405 would have to move to allow vehicle 401 to depart the parking arrangement.

A large number of alternative parking arrangements is possible for parking arrangements 301a to 310a and 401a to 406a according to which factors are switched on or off.

One notable deviation from the examples of FIGS. 3 and 4 is when the rearrangement factor (factor 3) is switched on. This factor allows vehicles to be 're-parked', such that each vehicle may not remain in the same location during the selection of subsequent parking arrangements. This is significantly different from the examples shown in FIGS. 3 and 4, in which each subsequently arriving vehicle is 'added-on' to the pre-existing parking arrangement to form a new parking arrangement; all previously-parked vehicles are treated as structures in the environment, thus remaining in the location they were allocated when they first arrived. In contrast, when the rearrangement factor (point 3) is switched on, each subsequently-arriving vehicle re-initiates the whole parking system for all vehicles present in the parking environment, such that the location of each vehicle is changeable between subsequent parking arrangements. Switching on of the rearrangement factor may allow further enhanced security.

FIGS. 5a to 5e (collectively FIG. 5) illustrate the formation of a parking arrangement when at least the rearrangement factor is switched on. As such the parking arrangement formed after the arrival of each successive vehicle is formed with at least the following factors being switched on:

TABLE 4

| Number | Factor |
| --- | --- |
| 1.5 | There is a hierarchy of vehicle importance/value |
| 2.5 | There is a hierarchy of door importance/value |
| 3.5 | The vehicles can be rearranged within the parking arrangement upon the subsequent arrival of further vehicles |
| 4.5 | Optimisation of space within the parking environment is not required |
| 5.5 | Vehicles of varying dimensions are present |
| 6.5 | Vehicles need not be positioned such that they can depart the arrangement without requiring other vehicles to temporarily relocate. |

A hierarchy of vehicle importance may be created based on a number of factors, such as different contents values, different car models, varying levels of door and/or window security depending on vehicle variables.

A hierarchy of door importance, e.g. within each vehicle, may be created based upon a number of factors, such as varying levels of door and/or window security and the value of contents contained within any compartment to which a door allows access.

Figure 5A:
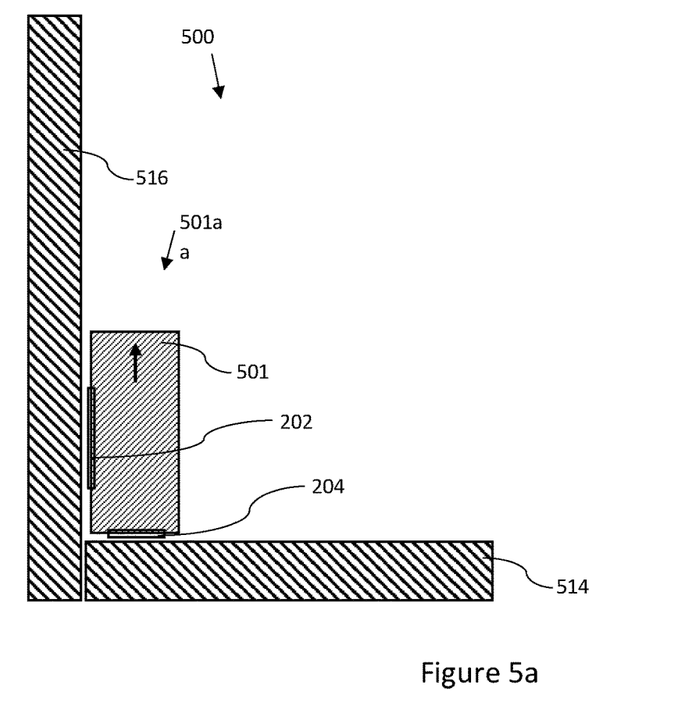
FIGS. 5a-e show a number of stages in the formation of a parking arrangement in an environment having two barriers.

FIG. 5a shows the parking arrangement 501a selected for vehicle 501 by the controller 104 in parking environment 500 using the process outlined in detail previously. Access to doors 202, 204 is prevented by the proximity of the barriers 514, 516 to the car body. The hatching used to shade vehicle 501 shows that it is of the highest importance of the vehicles 501 to 507.

Figure 5B:
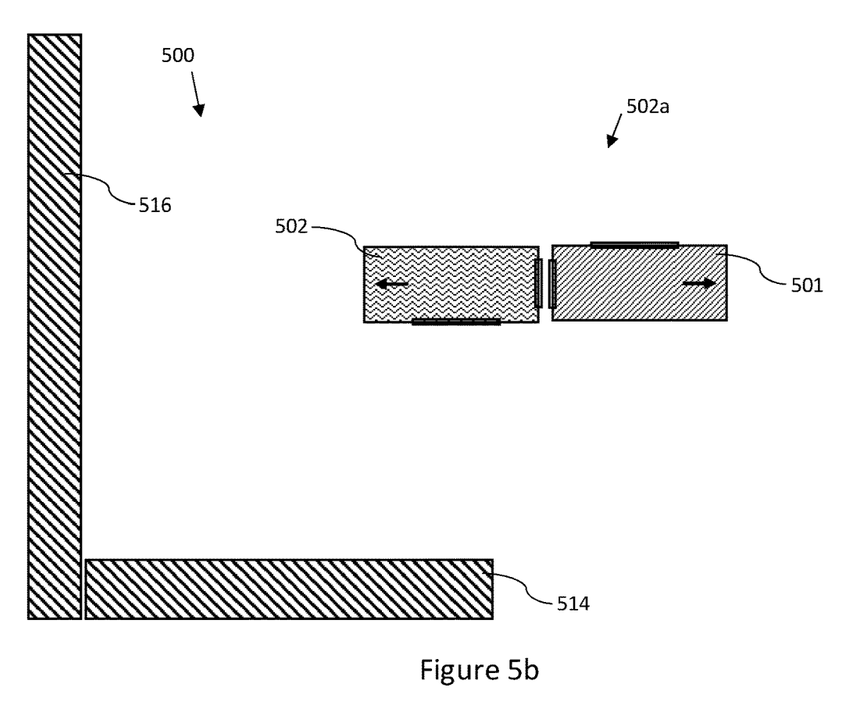

Vehicle 502 approaches the parking environment 500. The controller 104 selects the optimal parking arrangement 502a for vehicles 501, 502. This may be carried out using the information controller 104 receives regarding the environment 500, including vehicle 501, barriers 514, 516 and the factors numbered 1.5 to 6.5 listed above. In order for arrangement 502a to be formed, vehicle 501 must be rearranged from its position in parking arrangement 501a, i.e. the addition of a new vehicle to a parking arrangement may cause the rearrangement of vehicles already parked such that a new optimal parking arrangement is achieved. The "zig-zag" hatching of vehicle 502 shows that it is of second highest importance of the vehicles 501 to 507.

Figure 5C:
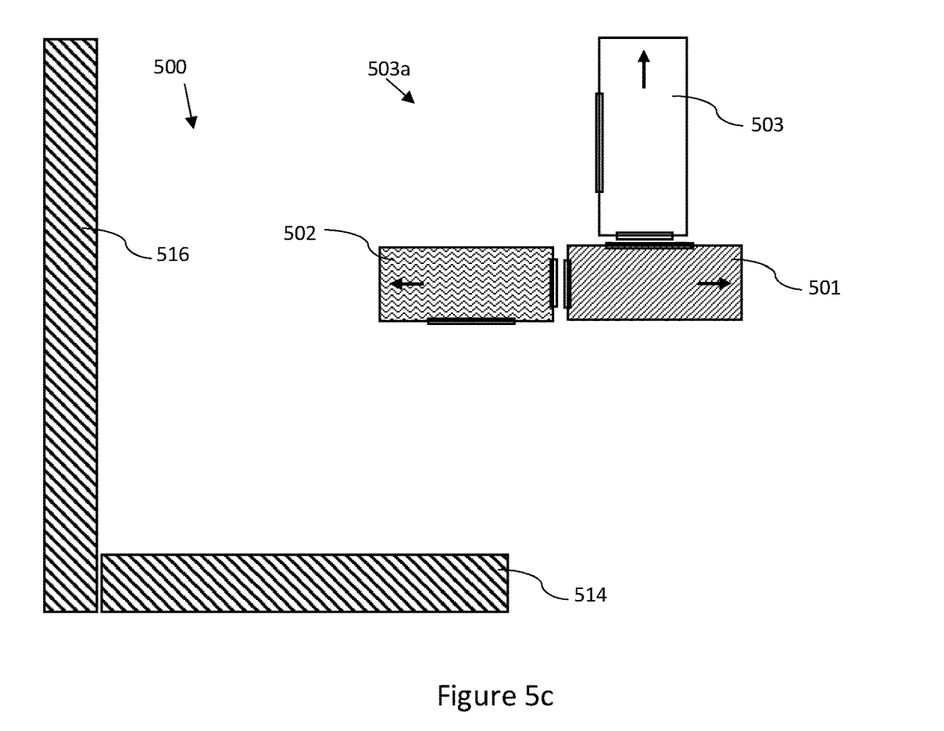
Figure 5D:
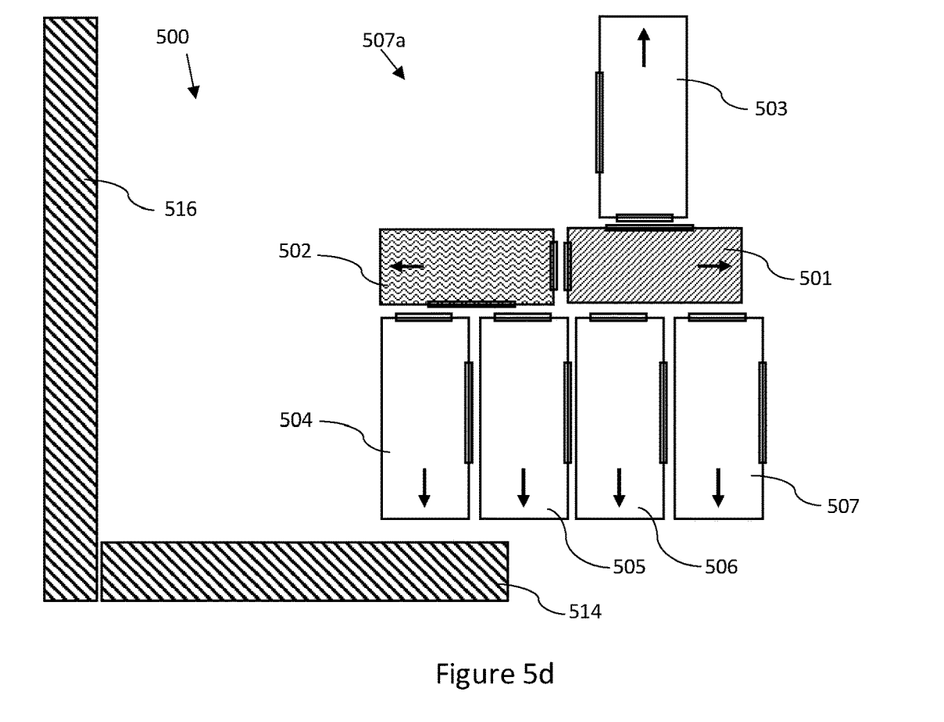

Vehicle 503 approaches the parking arrangement 502a, and the controller 104 selects a new parking arrangement 503a based upon the process previously outlined. Parking arrangement 503a is shown in FIG. 5c. Vehicle 503 parks transversely to vehicle 501 to cover the entirety of door 202 of vehicle 501. This parking location of vehicle 503 may be selected due to the higher importance of vehicle 501 over vehicle 502, the higher importance of door 202 of vehicle 501 over door 202 of vehicle 502, and/or the higher importance of door 204 of vehicle 503 over door 202 of vehicle 503.

Four more vehicles 504, 505, 506, 507 arrive in turn at the parking arrangement. Using the system previously outlined in detail, controller 104 determines that the vehicles can be parked in their positions shown in FIG. 5d to produce parking arrangement 507a. It is noted that a number of vehicles will not be able to depart the arrangement without requiring others to relocate, e.g. vehicle 504 is obstructed by barrier 514 at its front and vehicle 502 at its rear.

Figure 5E:
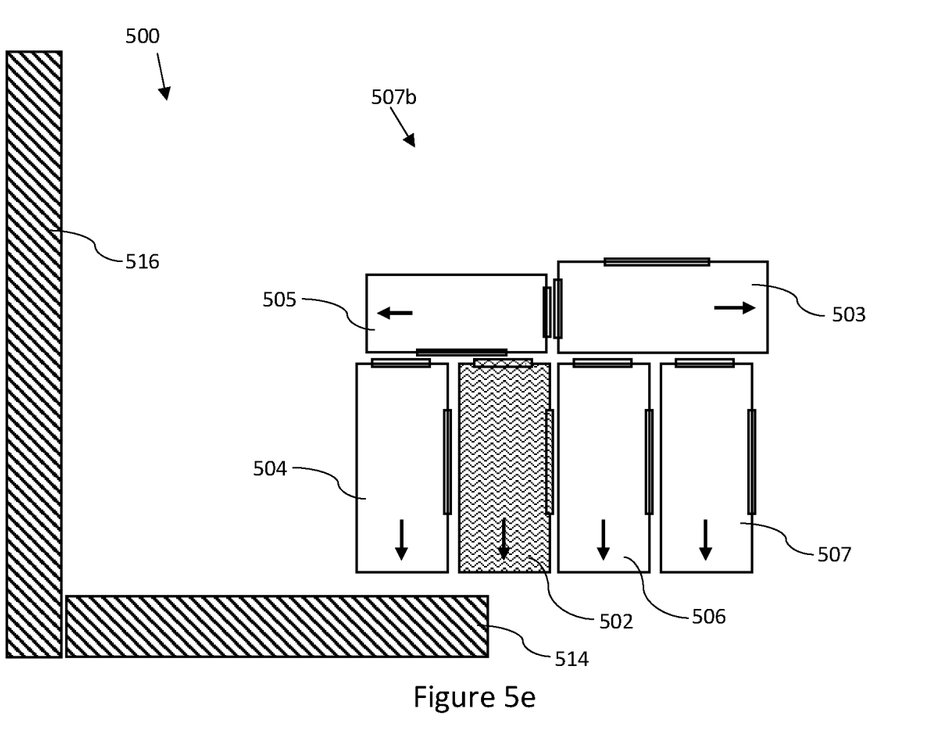

Vehicle 501 departs the parking arrangement 507a, possibly having been summoned by an owner. Upon departure of vehicle 501, vehicles 502 to 507 are left in the incomplete parking arrangement. The departure of a vehicle from the parking arrangement causes the re-initiation of the system for parking. Vehicle 502 is now the vehicle with the highest importance. The system selects a new parking arrangement. Selection of the new parking arrangement, 507b, causes the following rearrangements: vehicle 503 has been rearranged to the old position of vehicle 501, and vehicles 502 and 505 have swapped places. As such, vehicles which previously had their doors blocked may continue to have their doors blocked even after the departure of a vehicle providing the blocking effect. Parking arrangement 507b is optimised with respect to factors 1.5 to 6.5 listed above.

It is emphasised that the departure of a vehicle from a parking arrangement, which may include a parking environment, causes the re-initiation of the system for parking, which may lead to a number of the remaining vehicles being rearranged to form a new parking arrangement. In this way, the remaining vehicles co-operate by co-ordinating their parking such that the total combined security of all of the remaining vehicles is maximised according to the factors which are 'switched on'.

A number of other factors, not already disclosed, may be included in a list which the controller 104 uses to determine each parking arrangement:
1. Inclusion of multiple parking arrangements in each parking environment. In any parking environment, including parking environments 300, 400, 500, it possible for a number of parking arrangements to be formed within the same environment at the same time with different vehicles. Each parking arrangement within a common parking environment may be grouped according to which factors are switched on in common, e.g. those numbered 1 to 6 above. For example, the parking arrangements 507a and 507b leave space within parking environment 500 for a number of other vehicles to form their own parking arrangement. This additional parking arrangement may use the barriers 514, 516. Unlike the example of FIG. 5, the additional parking arrangement may have different factors switched on, for example, requiring that all vehicles be able to drive away without requiring others to move.
2. When selecting a new parking arrangement, it may be desirable to minimise the movement of vehicles, e.g. the total number of moves or the total distance moved may be minimised.
3. It may be desirable to arrange according to when each vehicle is to depart, e.g. short stay and long stay. Those staying longer may be parked further from the edges and/or proximally to vehicles departing at similar times.
4. Vehicles are parked according to a hierarchy, with vehicles nearest the top of the hierarchy being parked nearest the center of a parking arrangement. In this way, vehicles at the top of the hierarchy are the most secure.

As drivers are not necessary for parking manoeuvres to occur in autonomous and semi-autonomous vehicles, subsequently parking vehicles may block driver's doors and/or passenger doors. Similarly, fully autonomous vehicles may have certain adaptations which allow closer parking, such as the omission of wing mirrors. It is at least these factors that allow the parking method and system of the present disclosure to be optimised.

The invention claimed is:

1. A system, comprising:
one or more sensors; and
a controller configured to:
receive information from the one or more sensors regarding a first vehicle of a plurality of autonomous or semi-autonomous vehicles and information regarding an environment surrounding the first vehicle; and
park the first vehicle according to a parking arrangement that is selected such that access to and/or opening of at least one door of the first vehicle is prevented by proximity of the first vehicle to at least one of: a second vehicle of the plurality of vehicles, and a structure in the environment.

2. The system of claim 1, wherein the controller is further configured to:
obtain information regarding the second vehicle; and
park the second vehicle according to a second parking arrangement that is selected such that access to and/or opening of at least one door of the second vehicle is prevented by proximity of the second vehicle to at least one of: the first vehicle, the structure in the environment, and at least one third vehicle.

3. The system of claim 2, wherein the controller is further configured to:
obtain information regarding the at least one third vehicle; and
park the at least one third vehicle according to a third parking arrangement that is selected such that access to and/or opening of at least one door of the at least one additional vehicle is prevented by proximity of the at least one third vehicle to at least one of: the first vehicle, the second vehicle, the structure in the environment, and, if there one or more other vehicles in addition to the third vehicle, at least one of the one or more other vehicles.

4. The system of claim 1, wherein the structure in the environment is a barrier sufficient to prevent access to and/or opening of a door.

5. The system of claim 1, wherein the information regarding the environment includes information regarding the doors of any vehicles already parked in the environment.

6. The system of claim 1, wherein the at least one door is at least one of a side door and a rear door.

7. The system of claim 1, wherein the controller is further configured to select the parking arrangement such that a fewest number of vehicles are required to move for any single vehicle to leave the parking arrangement.

8. The system of claim 1, wherein the controller is further configured to select the parking arrangement such that the number of vehicles able to park in the environment is maximized.

9. The system of claim 1, wherein the controller is further configured to select the parking arrangement such that the total number of doors blocked is maximized.

10. The system of claim 1, wherein the controller is further configured to select the parking arrangement according to a pre-determined hierarchy.

11. The system of claim 10, wherein the controller is further configured to select the parking arrangement such that vehicles nearest the top of the hierarchy are parked nearest the center of the parking arrangement.

12. The system of claim 1, wherein at least one of the one or more sensors is disposed in a vehicle already parked in the parking environment.

13. The system of claim 12, wherein the vehicle already parked in the parking environment is configured to communicate the information to an approaching vehicle attempting to park.

14. The system of claim 1, wherein the controller is further configured to, upon arrival of a new vehicle, trigger re-parking of all vehicles within the parking environment according to a new parking arrangement.

15. The system of claim 14, wherein the controller is further configured to select the new parking arrangement such that a fewest number of changes to the previous parking arrangement are needed.

16. The system of claim 1, wherein the controller is further configured to, upon departure of any vehicle from the parking arrangement, trigger re-parking of all vehicles within the parking environment according to a new parking arrangement.

17. A method for parking a plurality of vehicles, the vehicles comprising at least one of an autonomous vehicle and a semi-autonomous vehicle, the method comprising:
   obtaining information regarding a first vehicle of the plurality of vehicles;
   obtaining information regarding an environment surrounding the first vehicle; and
   selecting a parking arrangement for the first vehicle,
wherein the parking arrangement is selected such that access to and/or opening of at least one door of the first vehicle is prevented by proximity of the first vehicle to at least one of:
   a second vehicle of the plurality of vehicles; and
   a structure in the environment.

18. The method of claim 17, further comprising:
   obtaining information regarding the second vehicle; and
   selecting a parking arrangement for the second vehicle,
wherein the parking arrangement is selected such that access to and/or opening of at least one door of the second vehicle is prevented by proximity of the second vehicle to at least one of:
   the first vehicle;
   the structure in the environment; and
   at least one additional vehicle.

19. The method of claim 18, further comprising:
   obtaining information regarding the at least one additional vehicle; and
   selecting a parking arrangement for the at least one additional vehicle,
wherein the parking arrangement is selected such that access to and/or opening of at least one door of the at least one additional vehicle is prevented by proximity of the at least one additional vehicle to at least one of:
   the first vehicle;
   the second vehicle;
   the structure in the environment; and
   if greater than one additional vehicle, other vehicles of the at least one additional vehicle.

20. The method of claim 17, wherein the information regarding the environment includes information regarding the doors of any vehicles already parked in the environment.

* * * * *